UNITED STATES PATENT OFFICE.

CARL BOSCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

PRODUCING AMMONIA.

1,243,382.   Specification of Letters Patent.   Patented Oct. 16, 1917.

No Drawing.   Application filed January 12, 1914.   Serial No. 811,677.

*To all whom it may concern:*

Be it known that I, CARL BOSCH, citizen of the German Empire, residing at Ludwigshafen-on-the-Rhine, Germany, have invented new and useful Improvements in Producing Ammonia, of which the following is a specification.

It has been found that, when manufacturing ammonia from its elements by means of catalytic agents in large contact apparatus under pressure and especially when employing very active catalytic agents and high pressure, the yield of ammonia decreases after working for some time. I have found that this decrease is not necessarily due to deterioration of the catalytic agent, but that, even in those cases in which no extra heat is supplied to the system, the temperature of the catalytic agent can rise to such a degree that the conversion of the gaseous mixture into ammonia diminishes. This objection I overcome by subjecting the interior of the catalytic agent to regulated cooling, such as is unnecessary in the case of working with small contact apparatus where a regular, or even continuous, supply of heat (for instance by means of electrically heated wires) is requisite. The cooling of the contact agent according to my invention can be effected easily, on a manufacturing scale, by passing cooling fluid through a spiral tube situated in the catalytic agent; for example, a cold mixture of gases, such for instance as that employed for passing through the catalytic agent for the production of ammonia, can be passed through the coil under the same pressure as that employed in the production of ammonia and, in this case, the inside and outside walls of the spiral tube are not subject to great differences of pressure. The invention is not, however, limited to this precise way of effecting the cooling.

Now what I claim is:—

1. In the process of producing ammonia by passing nitrogen and hydrogen over a hot catalytic agent, the step which consists in subjecting the interior of the catalytic agent to a regulated cooling.

2. In the process of producing ammonia by passing nitrogen and hydrogen over a hot catalytic agent, the step which consists in subjecting the interior of the catalytic agent to a regulated cooling by means of gas which is subsequently passed over the said catalytic agent.

In testimony whereof I have hereunto set my hand in the presence of two subscribing witnesses.

CARL BOSCH. [L. S.]

Witnesses:
 ERNEST G. EHRHARDT,
 S. S. BERGER.